R. L. & A. C. BETTS.
Shovel-Plow.
No. 42,813.
Patented May 17, 1864.
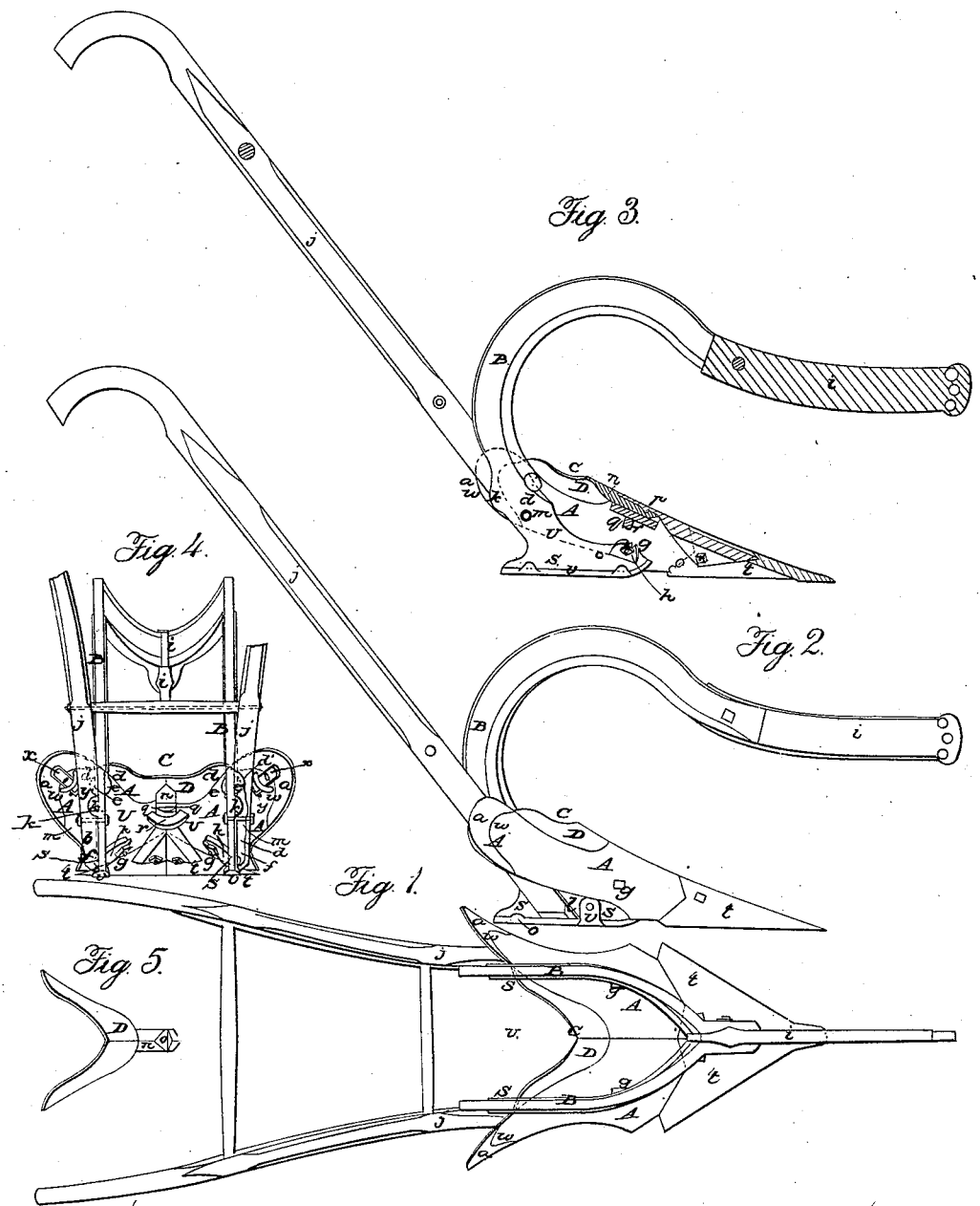
Witnesses.
Inventors.
Rodney L. Betts
Albert C. Betts

UNITED STATES PATENT OFFICE.

RODNEY L. BETTS AND ALBERT C. BETTS, OF BRUNSWICK, NEW YORK.

IMPROVEMENT IN PLOWS.

Specification forming part of Letters Patent No. 42,813, dated May 17, 1864.

*To all whom it may concern:*

Be it known that we, RODNEY L. BETTS and ALBERT C. BETTS, each of the town of Brunswick, in the county of Rensselaer and State of New York, have jointly invented certain new and useful Improvements in Plows, of which the following is a sufficient description, reference being had to the annexed drawings, in which—

Figure 1 is a plan, Fig. 2 a side elevation, Fig. 3 a vertical longitudinal section through the middle, Fig. 4 a rear elevation with some parts broken off, and Fig. 5 a plan of a detached part, all of a plow embodying our said invention, like parts being marked by the same letters in all the figures.

This invention consists primarily in the arrangement of a branched draw-beam, B B i, in combination with a double inclined mold-board, A A, made low, or with a recess in the middle portion of its top edge between the branches B B of the draw-beam, and furnished with a double share, t, and having spreading-wings w w extended outward in front of and laterally beyond the said beam-branches, so that when the plow is drawn along between two rows of growing plants the soil will be raised and loosened up by the said share and double mold-board, and that portions of the soil thus raised and loosened up will be spread by the mold-board wings w w toward the growing plants on each side of the plow, while the remaining portion of the loosened-up soil, with much of the sods, stones, and hard lumps of earth, (which latter generally accumulate in the middle part of the space between rows of growing plants and are raised up by the double share and mold-board,) will pass over the low middle part of the top of the mold-board, between the beam-branches B B, and drop into the furrow made by the plow, thereby leaving or depositing some of the loosened-up soil in the furrow cut by the share and spreading the rest of it toward the rows of plants on both sides of the plow, while at the same time most of the sods, stones, and hard lumps of earth that commonly lie in the middle of the space between the rows are prevented from being thrown outward against the growing plants by the mold-board as the plow is drawn along, and so that a person walking behind and holding the plow by its handles j j, as the plow is drawn along, can then have an unobstructed view between the beam-branches B B of the earth, stones, and sods as they are about being raised by the share and mold-board, and can consequently see better just how to turn and guide the plow properly, while the stones and sods have a more direct and unobstructed passage-way over the top of the mold-board, and are less liable to clog the plow than if the latter had a draw-beam proceeding from the middle of the top of the double mold-board.

Another part of our invention consists in making the low middle portion of the top part of the double mold-board A A in a separate piece, D, Figs. 5, 4, 3, from the main portion thereof, and so that it can be readily removed from and reattached to the said double mold-board when the latter is provided with a double share, t, and spreading-wings w w, and arranged in combination with a branched draw-beam, B B i, as above described, so that upon simply removing the detachable middle piece, D, from the main portion of the double mold-board the plow will be thereby made to spread less of the soil that is raised and loosened up by the share and mold-board outward toward the growing plants, and to cause more of the loosened-up soil to pass over the middle portion of the top edge of the mold-board and between the beam-branches B B into the furrow made by the plow as the latter is drawn along between two rows of growing plants, as is very requisite or desirable in cultivating and hilling rows of plants of various kinds and sizes.

Another part of our invention consists in forming runners S S on the lower ends of the two branches B B of a branched draw-beam, B B i, arranged in combination with a double mold-board, A A, having a double share, t, and spreading-wings w w, as above described, so that the lower ends, S S, of the beam-branches will slide along in and upon the bottom of the outer portions of the furrow cut by the share t, and directly under and in rear of the wings w w of the mold-board A A, and thereby hold the plow upright, or make it run steady and "hold" easy when the plow is drawn along to turn a double furrow, without requiring any special runners or supporting device, except what the two branches B B of the draw-beam afford.

We sometimes put on the lower ends, S S, of the beam-branches B B cast-iron shoes v v, which can be changed for new ones when worn out; and we sometimes make the wings *w w* with removable end pieces, *a a*, Figs. 1, 2, and 4, so that the plow can be altered to spread the soil less wide on either one or both sides by simply removing one or both of the detachable pieces *a a*, as is often desirable in using the plow between rows of different widths or upon side hills; and we sometimes put a very high middle piece in the place of the removable part D, and thereby change the plow so that it will turn or spread all the earth outward on both sides of the mold-board, as is desirable in plowing out clean and deep double furrows.

The shapes which we generally give to the aforesaid parts, and the means by which we generally secure them together, are clearly shown by the annexed drawings, like parts being marked by like letters in all the figures.

What we claim as new and of our invention, and desire to secure by Letters Patent, is—

1. The arrangement of a branched draw-beam, B B *i*, in combination with a double mold-board, A A, recessed or made low in the middle portion of its top edge between the beam-branches B B, and having a double share, *t*, and spreading-wings *w w*, extended laterally beyond the said beam-branches, substantially as herein described.

2. The arrangement of a branched draw-beam, B B *i*, in combination with a double mold-board, A A, provided with a double share, *t*, and lateral wings *w w*, and having the upper part, D, of its low or depressed middle portion removable, substantially as herein described.

3. The arrangement of a branched draw-beam, B B *i*, having runners S S formed on the lower ends of its branches B B, in combination with a double inclined mold-board, A A, having a double inclined share, *t*, and oblique spreading-wings *w w*, extended laterally beyond the said beam-branches, substantially as herein described.

RODNEY L. BETTS.
ALBERT C. BETTS.

Witnesses:
P. J. MARSH,
AUSTIN F. PARK.